(12) United States Patent
Chen et al.

(10) Patent No.: US 12,348,563 B2
(45) Date of Patent: *Jul. 1, 2025

(54) DOMAIN SQUATTING DETECTION

(71) Applicant: Palo Alto Networks, Inc., Santa Clara, CA (US)

(72) Inventors: Zhanhao Chen, Sunnyvale, CA (US); Jun Wang, Fremont, CA (US); Daiping Liu, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,298

(22) Filed: Mar. 19, 2024

(65) Prior Publication Data

US 2024/0259427 A1   Aug. 1, 2024

Related U.S. Application Data

(63) Continuation of application No. 17/408,054, filed on Aug. 20, 2021, now Pat. No. 11,973,800.

(51) Int. Cl.
*H04L 9/40* (2022.01)
*H04L 61/5046* (2022.01)
*H04L 61/5076* (2022.01)

(52) U.S. Cl.
CPC ...... *H04L 63/1483* (2013.01); *H04L 61/5046* (2022.05); *H04L 61/5076* (2022.05); *H04L 63/0236* (2013.01); *H04L 63/0263* (2013.01)

(58) Field of Classification Search
CPC ............. H04L 63/1483; H04L 63/0236; H04L 63/0263; H04L 61/5046; H04L 61/5076
See application file for complete search history.

(56) References Cited

U.S. PATENT DOCUMENTS

| | | | |
|---|---|---|---|
| 2016/0352772 A1* | 12/2016 | O'Connor | H04L 63/1483 |
| 2018/0063174 A1 | 3/2018 | Grill | |
| 2018/0139235 A1 | 5/2018 | Desai | |
| 2018/0357332 A1* | 12/2018 | Fan | G06F 16/334 |
| 2019/0075168 A1 | 3/2019 | Goldfarb | |
| 2020/0228500 A1* | 7/2020 | Olumofin | H04L 63/0236 |
| 2020/0287933 A1* | 9/2020 | Buck | H04L 61/4511 |
| 2021/0051174 A1* | 2/2021 | Kitahara | H04L 63/1483 |
| 2022/0078207 A1* | 3/2022 | Chang | H04L 61/4511 |
| 2022/0200941 A1* | 6/2022 | Lancioni | G06F 40/242 |
| 2022/0201036 A1* | 6/2022 | Nabeel | H04L 63/1425 |
| 2022/0377107 A1 | 11/2022 | Lee | |

* cited by examiner

*Primary Examiner* — Daniel B Potratz
*Assistant Examiner* — Matthias Habtegeorgis
(74) *Attorney, Agent, or Firm* — Van Pelt, Yi & James LLP

(57) ABSTRACT

Detection of squatting domains is disclosed. A set of new fully qualified domain names (FQDNs) is received. The set of new FQDNs is analyzed to detect domain squatting by identifying a subset of the new FQDNs as candidate squatting domains. The candidate squatting domains are distributed to a security device/service.

19 Claims, 10 Drawing Sheets

DOMAIN SQUATTING DETECTION

CROSS REFERENCE TO OTHER APPLICATIONS

This application is a continuation of U.S. patent application Ser. No. 17/408,054, entitled DOMAIN SQUATTING DETECTION filed Aug. 20, 2021 which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
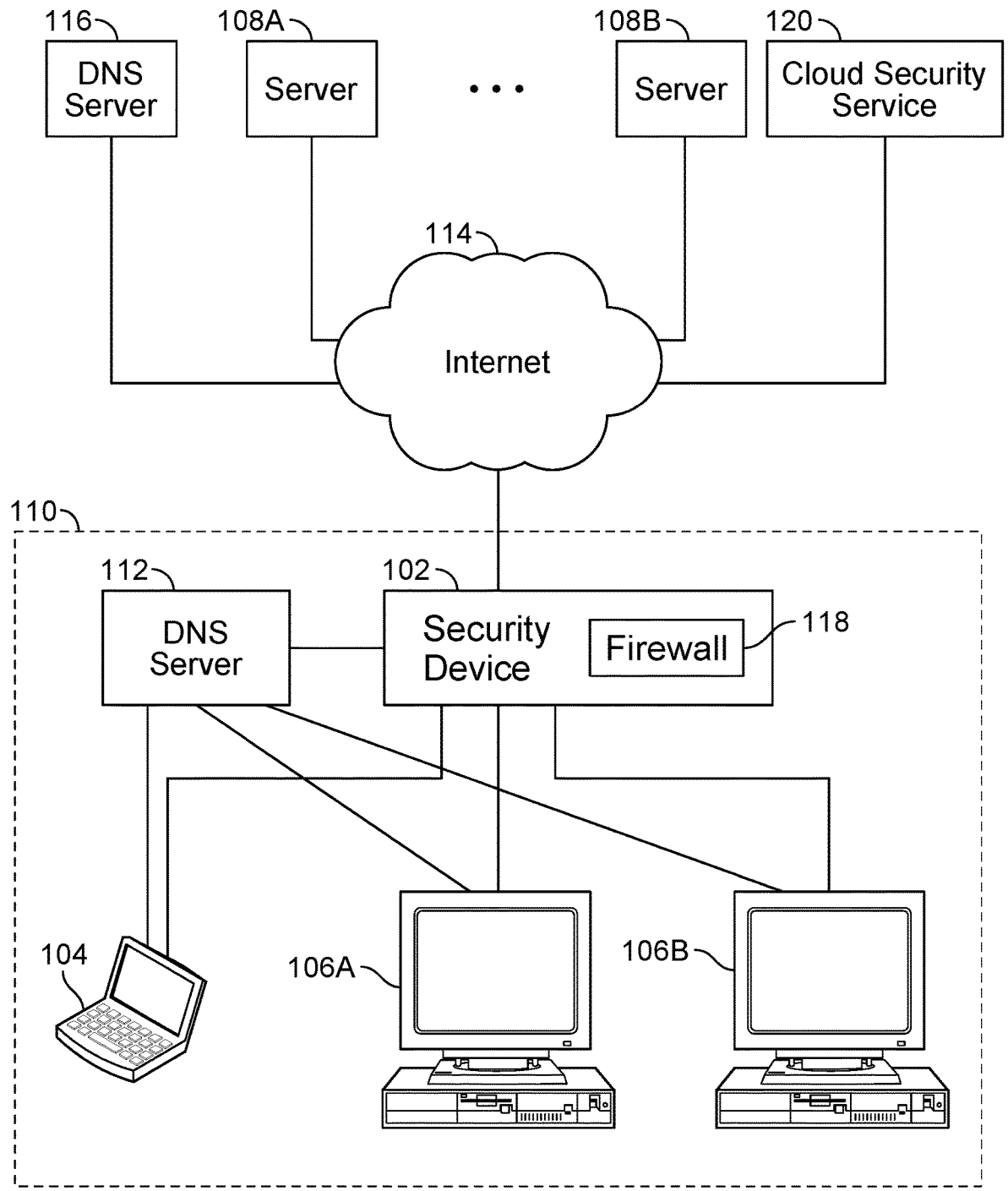
FIG. 1 is a functional block diagram illustrating an architecture of a system environment for domain squatting detection in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

End users rely on domain names to locate websites and web services on the Internet. Cybercriminals register squatting domains that are similar to well-known or popular domains hoping to deceive visitors into believing that the squatting domains are legitimate. For example, the cybercriminals register netflix-payments.com in the hopes that end users mistake the netflix-payments.com domain for a domain associated with Netflix™.

Various techniques are disclosed for detecting squatting domains by analyzing new fully qualified domain names (FDQN). These new FDQN include newly registered domains (NRD) and/or newly observed hostnames (NOH). The detection is performed with high efficiency where high scan speed can support a large scan space and long-tail squatting domains. Squatting domains can relate to domains that include specific keywords that target specific popular brands. The long-tail squatting domains relate to domains are on the "long tail" of the popularity distribution. For example, the disclosed detection techniques can be scalable for detecting attacks targeting trending domains.

In some embodiments, a system/method/computer program product for domain squatting detection includes receiving a set of new fully qualified domain names (FQDNs); analyzing the set of new FQDNs to detect domain squatting by identifying a subset of the new FQDNs as candidate squatting domains; and distributing the candidate squatting domains to a security device/service.

In some embodiments, the receiving of the set of new FQDNs comprises receiving a set of newly registered domains (NRDs); and the analyzing of the set of new FQDNs to detect domain squatting by identifying the subset of the new FQDNs as candidate squatting domains comprises: clustering the set of NRDs into lexically similar groups to obtain a plurality of NRD clusters; calculating distances from potential target domains to the plurality of NRD clusters; and identifying a subset of NRDs having the closest distance to the potential target domains as candidate typosquatting domains.

In some embodiments, the subset of NRDs having the closest distance comprises the subset of NRDs includes N NRDs that have the closest distance, N being an integer.

In some embodiments, the subset of NRDs having the closest distance comprise NRDs that have a distance to a potential target domain less than or equal to a distance threshold.

In some embodiments, the receiving of the set of new FQDNs comprises receiving a set of newly registered domains (NRDs); and the analyzing of the set of new FQDNs to detect domain squatting by identifying the subset of the new FQDNs as candidate squatting domains comprises constructing a trie for potential target domains; matching the set of NRDs against the trie to determine whether the set of NRDs matches the potential target domains; and in the event that a subset of NRDs matches the potential target domains, determining that the subset of matching NRDs are candidate combosquatting domains.

In some embodiments, the receiving of the set of new FQDNs comprises receiving a set of newly registered domains (NRDs); and the analyzing of the set of new FQDNs to detect domain squatting by identifying the subset of the new FQDNs as candidate squatting domains comprises converting one NRD of the set of NRDs into bits; comparing the bits of the one NRD with bits of a potential target domain using an exclusive OR (XOR) to obtain comparison results; determining whether a single difference bit exists using the comparison results; and in response to a determination that a single difference bit exists, determining that the one NRD is a candidate bitsquatting domain.

In some embodiments, the receiving of the set of new FQDNs comprises receiving a set of newly registered domains (NRDs); and the analyzing of the set of new FQDNs to detect domain squatting by identifying the subset of the new FQDNs as candidate squatting domains comprises detecting an NRD of the set of NRDs corresponds to an internationalized domain name (IDN); transforming the IDN to a unicode domain name version using a converter; identifying an international character in the unicode domain name version; substituting, using a lookup table, a corresponding homographic English character for the international character in the unicode domain name version to obtain a homographic domain name version; comparing the homographic domain name version with a set of potential target domains; and in response to a determination that the homographic domain name version matches at least one potential target domain of the set of potential target domains, determining that the NRD is a candidate homograph-squatting domain.

In some embodiments, the receiving of the set of new FQDNs comprises receiving a set of newly observed hostnames (NOHs); and the analyzing of the set of new FQDNs to detect domain squatting by identifying a subset of the new FQDNs as candidate squatting domains comprises splitting an NOH of the set of NOHs into a plurality of first segments; splitting a potential target domain into a plurality of second segments; comparing the plurality of first segments with the plurality of second segments; and in response to a determination that the plurality of first segments matches the plurality of second segments, determining that the NOH is a candidate levelsquatting domain.

In some embodiments, the segments of the plurality of first segments and the plurality of second segments are separated by periods or dashes.

In some embodiments, the system/method/computer program product for domain squatting detection further includes after the identifying of the candidate squatting domains: checking whether a candidate squatting domain uses a same name server or a same autonomous system number (ASN) as a corresponding potential target domain; and in response to a determination that the candidate squatting domains use the same name server or the same ASN as the corresponding potential target domains, filtering out the candidate squatting domain from the domain name registrant.

FIG. 1 is a functional block diagram illustrating an architecture of a system environment for domain squatting detection in accordance with some embodiments. As shown, a security device 102 is at the perimeter of a protected network 110 (e.g., an enterprise network), which includes client devices (e.g., clients) 104, 106A, and 106B. For example, security device 102 can include a firewall function, such as firewall 118 as shown, to protect the network and various computing devices (e.g., client devices, servers, and/or other computing devices) within network 110, which is in communication with the Internet 114 and various servers, such as DNS server 116, and other Internet resources/servers shown as 108A and 108B (e.g., web servers, mail servers, file servers such as an FTP server, and/or other types of resources/servers). For example, security device 102 can be implemented as a data appliance or a server that can perform various security functions, including firewall 118. Security device 102 is also in communication with a cloud security service 120 via Internet 114 as shown. In some implementations, security device 102 is implemented using a data appliance (e.g., a security appliance), a gateway (e.g., a security server), a server (e.g., a server that executes security software including firewall 118), and/or some other security device, which, for example, can be implemented using computing hardware, software, or various combinations thereof.

In some implementations, one or more of clients 104, 106A, and 106B can include a firewall (e.g., host-based firewall). For example, clients 104, 106A, and 106B can include various computing devices that can access the Internet via wired and/or wireless communications, such as computers, laptops, tablets, smart phones, and/or various other types of computing devices with network communication capabilities. As is also shown, Internet resources/servers shown as 108A and 108B are in communication with the Internet 114. For example, a client device can access a service provided by a server via the Internet, such as a web related service (e.g., web sites, cloud-based services, streaming services, or email services), peer-to-peer related service (e.g., file sharing), IRC service (e.g., chat service), and/or any other service that can be delivered via the Internet.

As is also shown in FIG. 1, clients 104, 106A, and 106B are also in communication with a local DNS server 112 of network 110. For example, DNS server 112 can perform a DNS service to translate a domain name into an IP address. For example, when a user types in a domain name (e.g., an Internet or Intranet domain name), such as example.com, using a web browser on a client (e.g., client 104, 106A, or 106B), an authoritative DNS server can translate the domain name into an IP address, such as 172.16.254.1 (for IPv4) and 2001:db8:0:1234:0:567:8:1 (for IPv6). If DNS server 112 does not have a locally cached result for the requested domain name, then DNS server 112 can communicate to another DNS server, such as DNS server 116 via Internet 114 to obtain the translation for the domain name into an IP address (e.g., note that the communication between DNS server 112 and DNS server 116 passes through security device 102 as shown). In contrast, DNS requests from clients 104, 106A, and 106B to local DNS server 112 are not required to pass through security device 102 as shown for the network architecture for network 110. As similarly discussed above, if a user or client attempts to perform a DNS lookup or host command on a squatting domain, such as whatslapp.com, then a visitor can be deceived into believing that a potentially malicious site is legitimate.

In particular, any processor of Internet resources 120 can be used for implementing various techniques for domain squatting detection as described herein with respect to various embodiments. After the processor identifies candidate squatting domains, the processor sends the candidate squatting domains to the security device 102, or the security device 102 can retrieve the candidate squatting domains from the processor. Subsequently, the security device 102 can filter HTTP requests from clients 104, 106A, and 106B, and the filtering can include the candidate squatting domains.

In some embodiments, detection of candidate squatting domains using the disclosed techniques can be implemented using cloud security service 120. For example, security device 102 (e.g., an integrated security appliance/gateway/server) can communicate with cloud security service 120 (e.g., using secure communications, such as encrypted communication techniques using standard or well-known encryption protocols) to receive the candidate squatting domains. In another example, cloud security service 120 (e.g., using secure communications, such as encrypted communication techniques using standard or well-known encryption protocols) can report (e.g., to a network or security administrator associated with network 110) that a user (e.g., client device 104, 106A, and 106B) is attempting to access a candidate squatting domain. As will now be apparent, some or all of the functions described above with respect to FIG. 1 can be assisted by or implemented in whole or in part by cloud security service 120.

Figure 2:
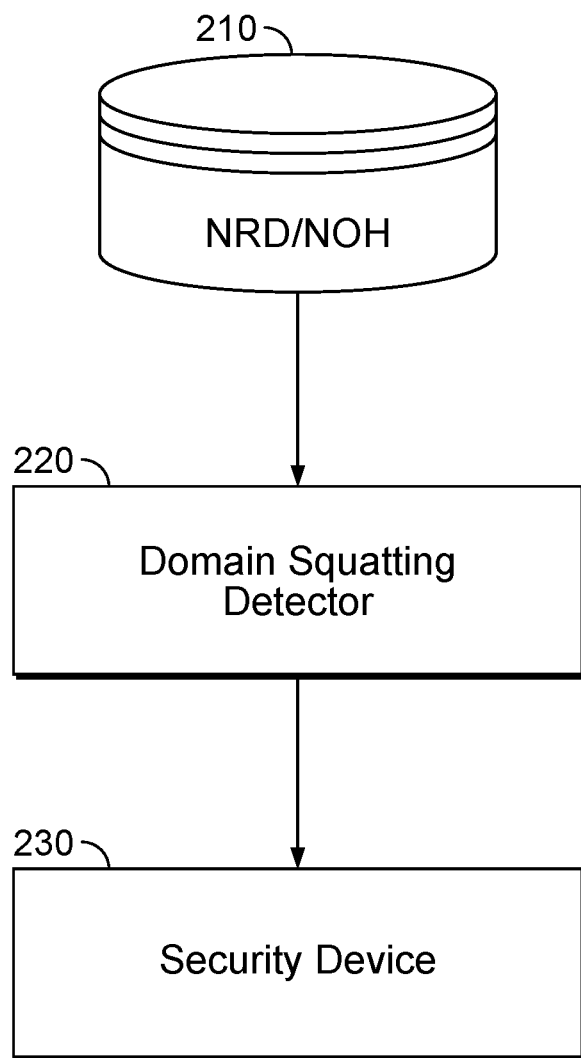
FIG. 2 is an example system for domain squatting detection in accordance with some embodiments.

FIG. 2 is an example system for domain squatting detection in accordance with some embodiments. In some embodiments, a database 210 (e.g., implemented as part of a cloud security service 120 as shown in FIG. 1) stores new fully qualified domain names (FQDNs) identified over a recent period of time. In some embodiments, the new FQDNs include newly registered domains (NRDs), newly observed hostnames (NOHs), or both. An example of an NRD is www.xyzabc.com because the domain xyzabc.com has not yet been registered. An example of an NOH is xyzabc.microsoft.com because the domain microsoft.com has already been registered, but the hostname xyzabc.microsoft.com has not been observed yet.

Domain squatting detector 220 (e.g., implemented as part of a cloud security service 120 as shown in FIG. 1) receives the new fully qualified domain names (FQDNs), analyzes the new FQDNs to detect domain squatting by identifying a subset of the new FQDNs as candidate squatting domains, and distributes the candidate squatting domains to a security device 230 (e.g., such as security device 102 as shown in FIG. 1). In some embodiments, the domain squatting detector 220 corresponds with a processor of a cloud security service 120 of FIG. 1. In an example implementation, the domain squatting detector 220 implements the disclosed domain squatting techniques as will be further described below with respect to FIGS. 3 through 9. Subsequently, the security device 230 can protect a network by performing an action when detecting a request to access candidate squatting domains, such as further described below.

Figure 3:
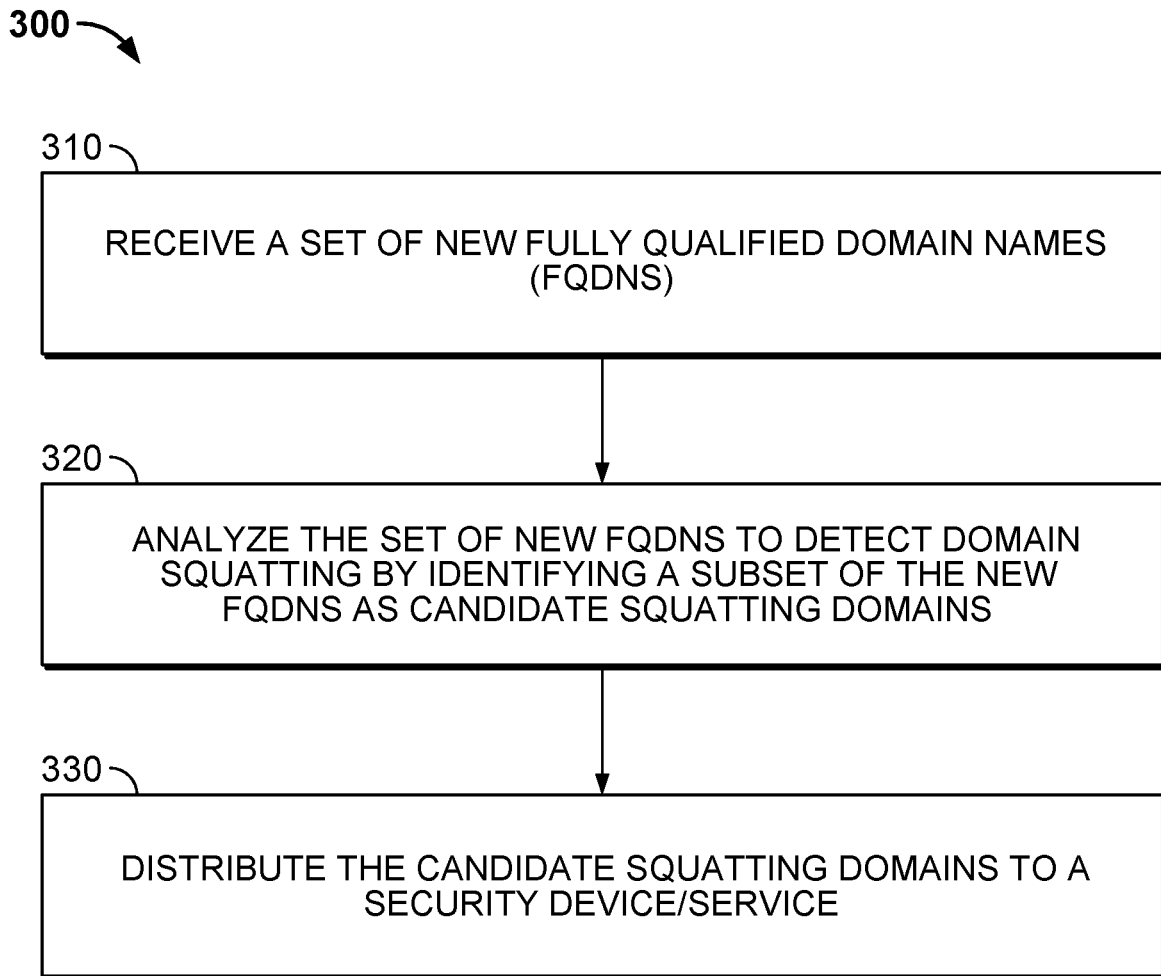
FIG. 3 is a flow diagram illustrating a process for detecting domain squatting in accordance with some embodiments.

FIG. 3 is a flow diagram illustrating a process for detecting domain squatting in accordance with some embodiments. In some embodiments, the process 300 is implemented by the domain squatting detector 220 of FIG. 2 and comprises:

In 310, the domain squatting detector receives a set of new fully qualified domain names (FQDNs). In some embodiments, the set of new fully qualified domain names (FQDNs) includes a set of newly registered domains (NRDs), a set of newly observed hostnames (NOH), or both.

In 320, the domain squatting detector analyzes the set of new FQDNs to detect domain squatting by identifying a subset of the new FQDNs as candidate squatting domains. In some embodiments, the domain squatting includes identifying one or more of the following: candidate typosquatting domains, candidate combosquatting domains, candidate bitsquatting domains, candidate levelsquatting domains, and/or candidate homosquatting domain.

In some embodiments, a candidate typosquatting domain includes a stray letter added, substituted, or removed in a potential target domain. For example, whatsalpp.com is an example of a candidate typosquatting domain with respect to the popular domain whatsapp.com because the letter 1 has been added to the potential target domain.

In some embodiments, a candidate combosquatting domain includes adding a word to a well-known/popular domain. For example, netflix-payments.com is an example of a candidate combosquatting domain with respect to the popular domain netflix.com because "payments" has been added to the potential target domain.

In some embodiments, a candidate bitsquatting domain includes swapping a bit in a potential target domain after the potential target domain has been converted to a series of bits. For example, micposoft.com is an example of a candidate bitsquatting domain with respect to the popular domain microsoft.com.

In some embodiments, a candidate levelsquatting domain includes attaching a potential target domain as part of a subdomain. For example, icloud.com is the potential target domain contained within the example candidate levelsquatting domain icloud.com-iphone.support.com. In this example, both icloud and com are both found in the example candidate levelsquatting domain, icloud and com are neighbors in the example candidate levelsquatting domain, and in order a specific order where icloud occurs before com in the example candidate levelsquatting domain.

In some embodiments, a candidate homosquatting domain is an internationalized domain name (IDN) that replaces a character of a popular domain with a similar foreign character. For example, a new FQDN xn--microsof-wyb.com is determined to be an IDN. The IDN is converted to unicode domain microsoft.com using a punycode converter. Subsequently, international characters, such as t, are identified in the unicode domain microsoft.com. The international character t is substituted with a corresponding homographic English character t using a lookup table to obtain a homographic domain name microsoft.com. The homographic domain name is compared with potential target domains to determine whether there is a match. If there is a match, then the new FQDN xn--microsof-wyb.com is determined to be a candidate homosquatting domain.

In 330, the domain squatting detector distributes the candidate squatting domains to a security device/service. In some embodiments, the security device/service performs a security action upon detecting a client device is attempting to access a candidate squatting domain. In some embodiments, the security action includes shunting traffic destined for the candidate squatting domain to another safe website, blocking attempts to access the candidate squatting domain, sending a warning to the client device, or various other responsive/security actions can be performed.

Figure 4:
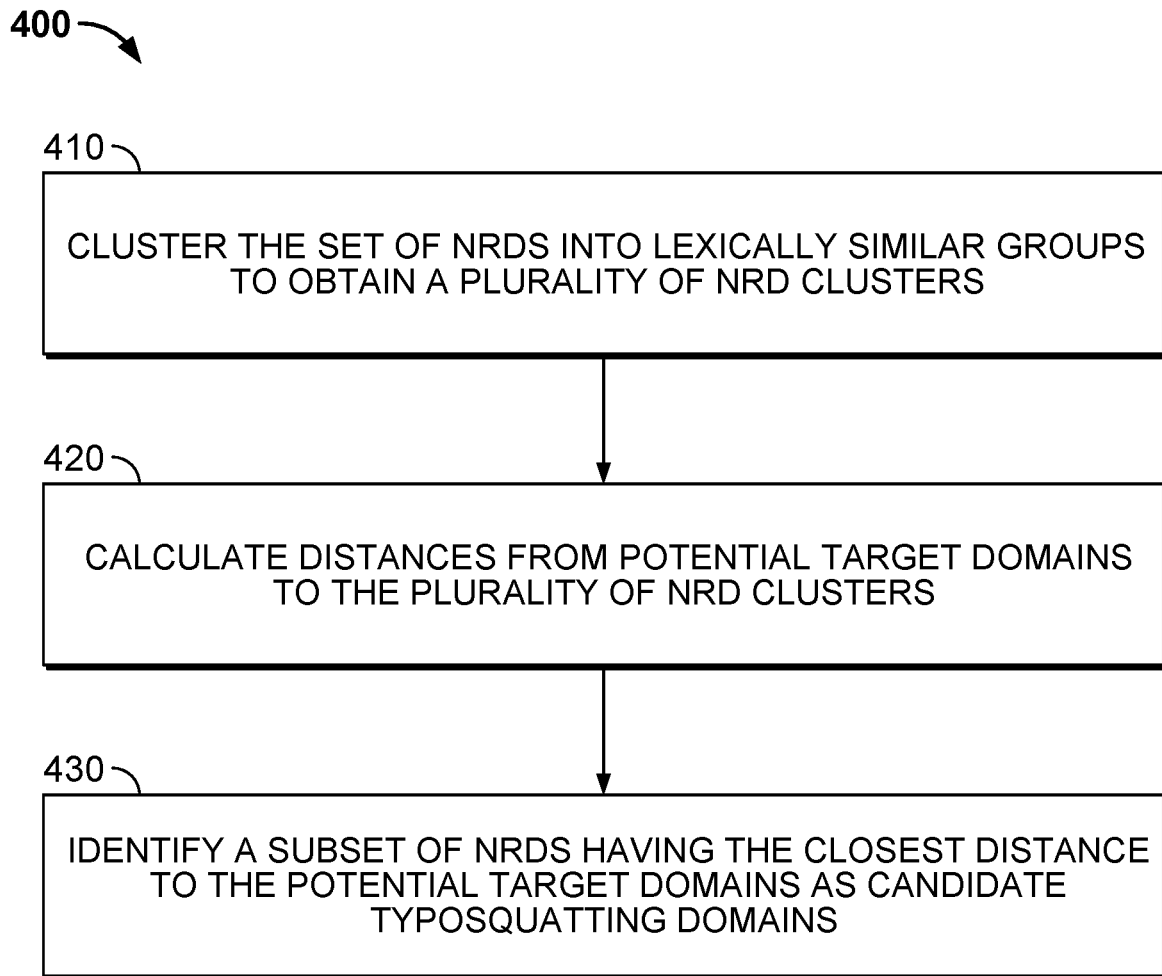
FIG. 4 is a flow diagram illustrating a process for detecting a candidate typosquatting domain in accordance with some embodiments.

FIG. 4 is a flow diagram illustrating a process for detecting a candidate typosquatting domain in accordance with some embodiments. In some embodiments, the process 400 is an implementation of operation 320 of FIG. 3 and comprises:

In some embodiments, in 310 of FIG. 3, the receiving of the set of new FQDNs includes a set of NRDs.

Referring back to FIG. 4, in some embodiments, before performing 410, the domain squatting detector first filters out randomly generated domains such as, for example, domains generated by a domain generation algorithm (DGA) to reduce the scan space. DGA domains correspond with gibberish words and can be filtered by calculating entropy of a set of domain names and discarding those domain names having abnormally high entropy.

In 410, the domain squatting detector clusters the set of NRDs into lexically similar groups to obtain a plurality of NRD clusters. For example, the following words (gogole, ogogle, googel) are in a lexically similar group.

In some embodiments, bi-gram term frequency-inverse document frequency (TF-IDF) is a technique used to vectorize domain names based on their lexical characteristics, and after all of the domain names have been transferred to the vector, density-based spatial clustering of applications with noise (DBSCAN) is performed to group the vectorized domain names into clusters.

In 420, the domain squatting detector calculates distances from potential target domains to the plurality of NRD clusters.

In some embodiments, in the event that the distance is greater than a predefined distance threshold then the entire NRD cluster is ignored. In some embodiments, the selected NRD is a single NRD. In some embodiments, the selected NRD is the first NRD of the NRD cluster. In some embodiments, the selected NRD is randomly selected from the NRD cluster. In some embodiments, a distance between a potential target domain and a selected NRD of an NRD cluster is measured, and in the event that the distance is less than or equal to a predefined distance threshold, the NRDs of the NRD cluster associated with the selected NRD are further evaluated to be candidate typosquatting domains.

Because the NRD cluster contains similar domains, if the distance of the selected NRD to the potential target domain exceeds the distance threshold, the entire NRD cluster is discarded from analysis to reduce calculations and increase speed of the calculations.

In the event that the distance of the selected NRD to the potential target domain is less than or equal to the distance threshold, the domain squatting detector analyzes a distance of each NRD of the NRD cluster containing the selected NRD to the potential target domain.

In 430, the domain squatting detector identifies a subset of NRDs having the closest distance to the potential target domains as candidate typosquatting domains. In some embodiments, the subset of NRDs includes the N closest NRDs to potential target domains and N is a positive integer. In some embodiments, the subset of NRDs includes all NRDs of the NRD cluster containing the selected NRD that have a distance to a potential target domain less than or equal to the predefined distance threshold is determined to be candidate typosquatting domains. In some embodiments, distances of NRDs of the remaining NRD clusters of the NRD cluster containing the selected NRD are analyzed to determine if the distances are less than or equal to the predefined distance threshold.

Because the remaining NRDs of the cluster associated with the selected NRD are discarded if the distance of the selected NRD is greater than a predefined distance threshold, the above time complexity of this typosquatting detection technique is much faster than brute force typosquatting techniques, so the above typosquatting detection technique is much more efficient and faster.

Figure 5A:
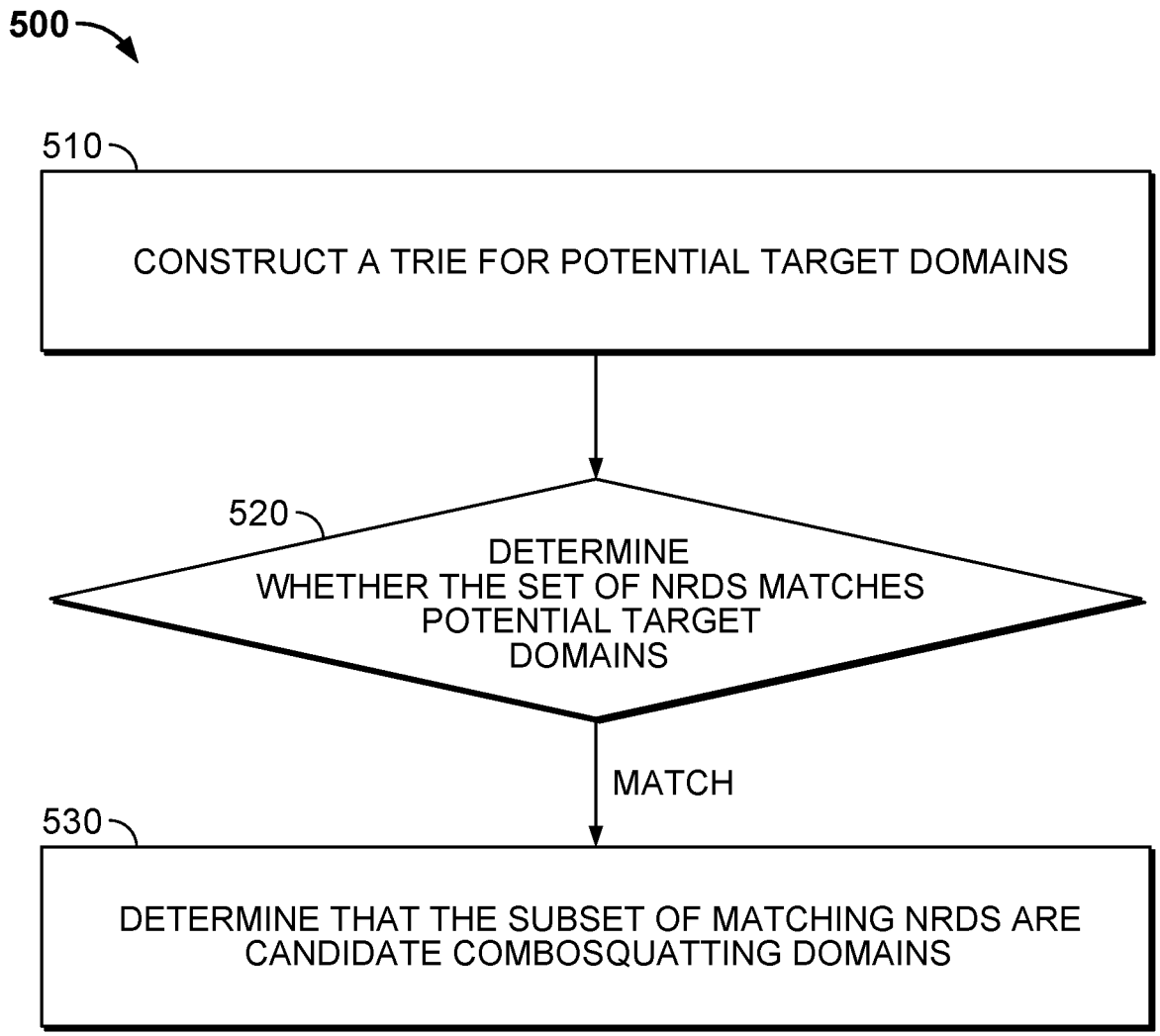
FIG. 5A is a flow diagram illustrating a process for detecting a candidate combosquatting domain in accordance with some embodiments.

FIG. 5A is a flow diagram illustrating a process for detecting a candidate combosquatting domain in accordance with some embodiments. In some embodiments, the process 500 is an implementation of operation 320 of FIG. 3 and comprises:

In some embodiments, in 310 of FIG. 3, the receiving of the set of new FQDNs includes a set of NRDs.

Referring back to FIG. 5A, in 510, the domain squatting detector constructs a trie for potential target domains. In some embodiments a trie is also known as a prefix tree.

In 520, the domain squatting detector matches the set of NRDs against the trie to determine whether the set of NRDs matches potential target domains.

In some embodiments, the trie is traversed to determine whether any NRDs match a potential target domain on a given trie. In some embodiments, the potential target domains include well-known/popular domains. In some embodiments, the potential target domains include a predefined number, e.g., 1000, 2000, 10000, 100000, 500000, etc., of the most popular websites identified by Alexa™. In some embodiments, the potential target domains also include critical websites such as, banks, financial institutions, etc.

In 530, in the event that a subset of NRDs matches the potential target domains, the domain squatting detector determines that the subset of matching NRDs are candidate combosquatting domains.

Figure 5B:
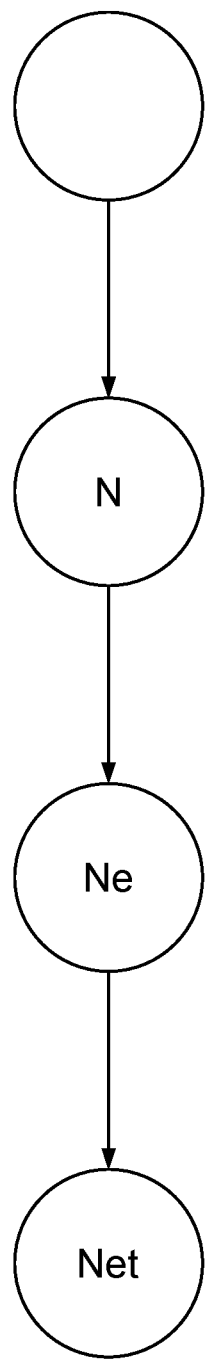
FIG. 5B is an example of a trie.

FIG. 5B is an example of a trie.

In this example, the root of the trie is blank, and an NRD traverses the trie. Using NRD net-payment.com as an example, the first letter of the NRD is compared with a child of the root node and if there is a match, for example, the first letter of the NRD is N which matches the child of the root node, which is N, then the first 2 letters of the NRD is compared with the letters Ne, which is a child of node N, and if there is a match then the first 3 letters of the NRD is compared with Net, which is a child of node Ne. Since the first 3 letters of the NRD matches a leaf of the trie, which is Net, the NRD is determined to match, and the NRD net-payment.com is determined to be a candidate. Any portion of the NRD can be matched with the trie. In another example, NRD xxxnetyyy.com would also be considered to match because the "net" portion of the NRD would match the trie. However, if no portion of the NRD matches the trie then the NRD is determined not to be a candidate.

In this example, since the NRD net-payments.com matches the trie, the NRD net-payments.com is determined to be a candidate combosquatting domain.

Figure 6:
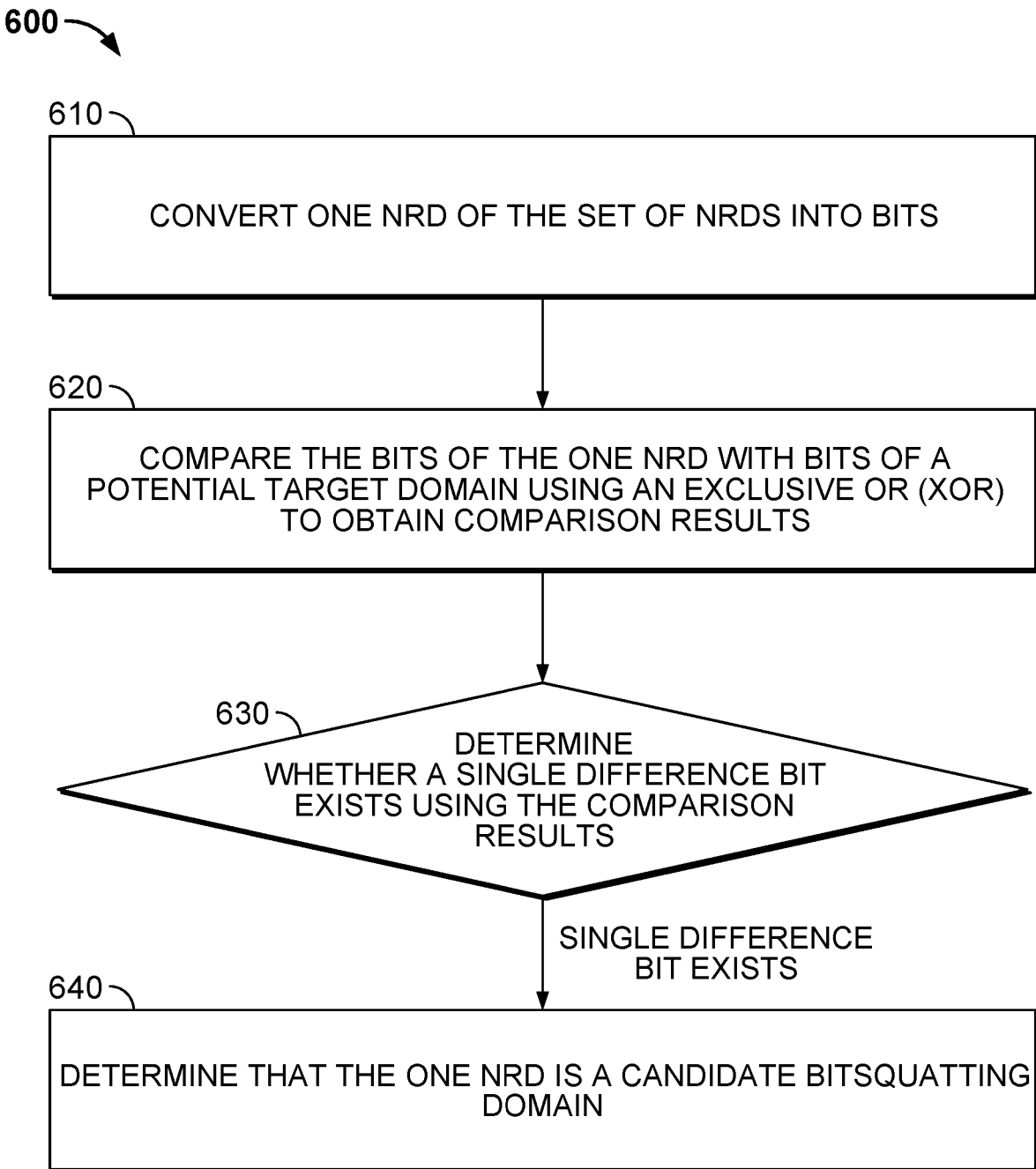
FIG. 6 is a flow diagram illustrating a process for detecting a candidate bitsquatting domain in accordance with some embodiments.

FIG. 6 is a flow diagram illustrating a process for detecting a candidate bitsquatting domain in accordance with some embodiments. In some embodiments, the process 600 is an implementation of operation 320 of FIG. 3 and comprises:

In some embodiments, in 310 of FIG. 3, the receiving of the set of new FQDNs includes a set of NRDs.

Referring back to FIG. 6, in 610, the domain squatting detector converts one NRD of the set of NRDs into bits. In some embodiments, the one NRD is converted into bits using ASCII encoding. For example, micposoft.com corresponds with the binary string 01101101 01101001 01100011 01110000 01101111 01110011 01101111 01100110 01110100 00101110 01100011 01101111 01101101, and microsoft.com corresponds with the binary string 01101101 01101001 01100011 01110010 01101111 01110011 01101111 01100110 01110100 00101110 0110001101101111 01101101.

In 620, the domain squatting detector compares the bits of the one NRD with bits of a potential target domain using an exclusive OR (XOR) to obtain comparison results. In some embodiments, the bits are compared using a bitwise comparison. Using the micposoft.com and microsoft.com example, the comparison results correspond to 00000000 00000000 00000000 00000010 00000000 00000000 00000000 00000000 00000000 00000000 00000000 00000000 00000000, which includes only 1 difference bit or a single difference bit.

In 630, the domain squatting detector determines whether a single difference bit exists using the comparison results.

In 640, in response to a determination that the single difference bit exists, the domain squatting detector determines that the one NRD is a candidate bitsquatting domain.

Figure 7:
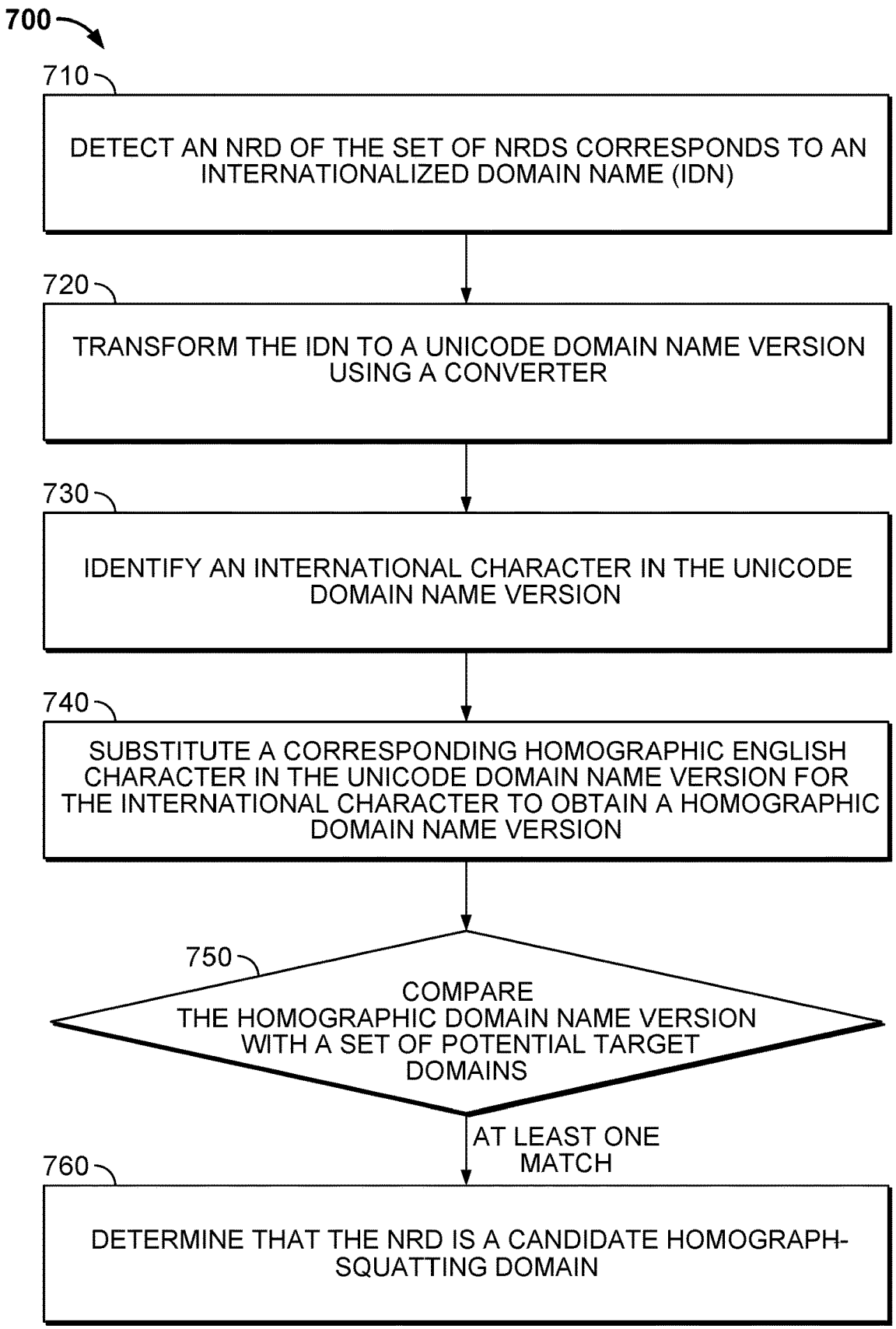
FIG. 7 is a flow diagram illustrating a process for detecting a candidate homosquatting domain in accordance with some embodiments.

FIG. 7 is a flow diagram illustrating a process for detecting a candidate homosquatting domain in accordance with some embodiments. In some embodiments, the process 700 is an implementation of operation 320 of FIG. 3 and comprises:

In some embodiments, in 310 of FIG. 3, the receiving of the set of new FQDNs includes a set of NRDs.

Referring back to FIG. 7, in 710, the domain squatting detector detect an NRD of the set of NRDs corresponds to an internationalized domain name (IDN). For example, the domain squatting detector detects that the NRD begins with xn-- indicating that the NRD is an IDN.

For example, since the NRD is xn--microsof-wyb.com, the domain squatting detector recognizes the NRD is an internationalized domain name because the NRD begins with an xn-- prefix.

In 720, the domain squatting detector transforms the IDN to a unicode domain name version using a converter. For example, the IDN is transformed to the unicode domain microsoft.com using a punycode converter.

In 730, the domain squatting detector identifies an international character in the unicode domain name version. For example, the domain squatting detector identifies the international character t in the unicode domain microsoft.com. Another example of an international character includes Cyrillic letter "a".

In 740, the domain squatting detector substitutes, using a lookup table, a corresponding homographic English character for the international character to obtain a homographic domain name version. For example, the domain squatting detector substitutes the English letter t for the international character t to obtain the homographic domain microsoft-.com. In another example, English letter "a" (U+0061) is substituted for Cyrillic letter "a" (U+0430).

In 750, the domain squatting detector compares the homographic domain name version with a set of potential target domains. For example, the domain squatting detector determines that microsoft.com (with the English letter t) matches a potential target domain (microsoft.com).

In 760, in response to a determination that the homographic domain name version matches at least one potential target domain of the set of potential target domains, the domain squatting detector determine that the NRD is a candidate homograph-squatting domain. For example, the domain squatting detector determines that the NRD xn--microsof-wyb.com is a candidate homosquatting domain.

Figure 8:
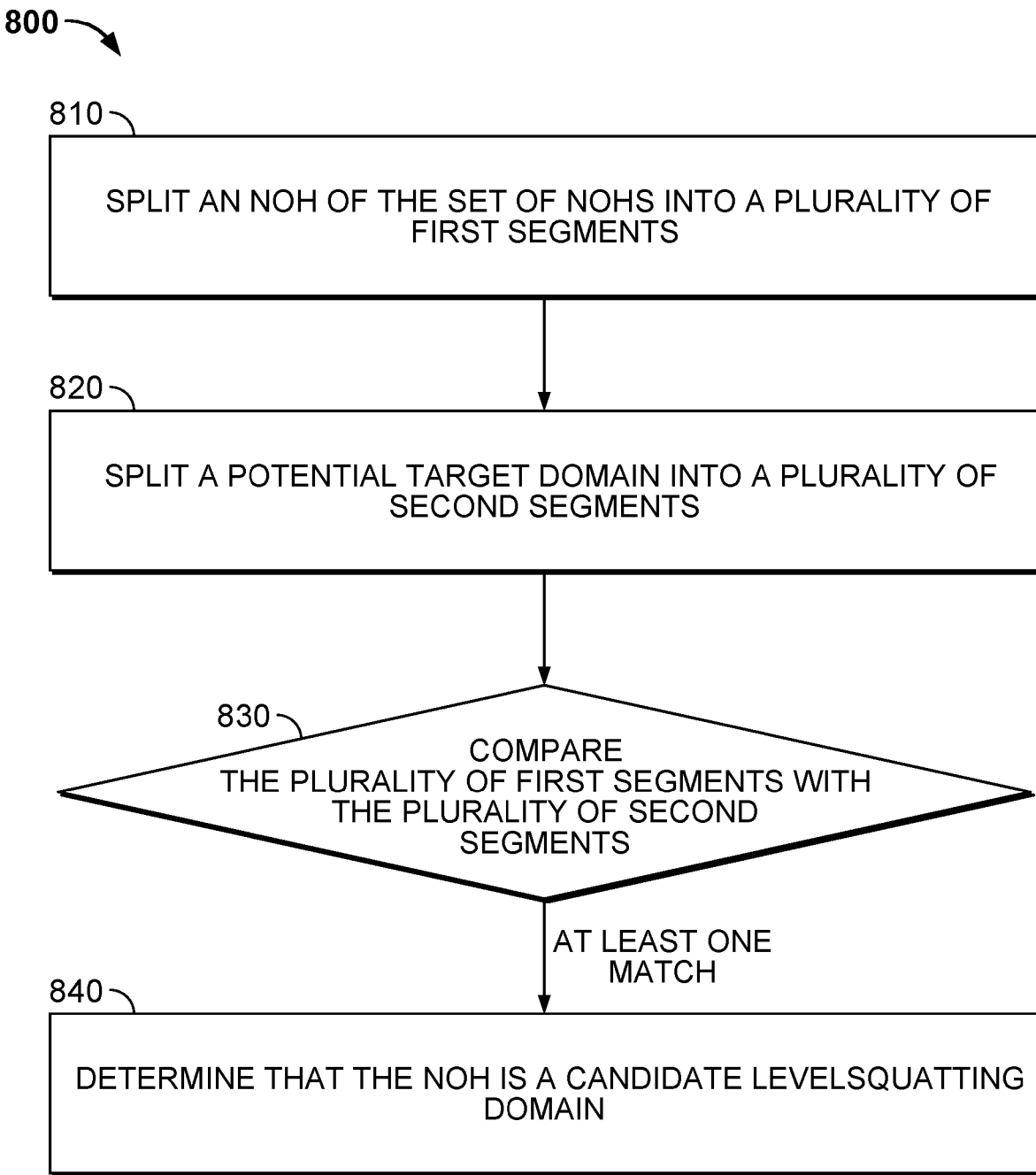
FIG. 8 is a flow diagram illustrating a process for detecting a candidate levelsquatting domain in accordance with some embodiments.

FIG. 8 is a flow diagram illustrating a process for detecting a candidate levelsquatting domain in accordance with some embodiments. In some embodiments, the process 800 is an implementation of operation 320 of FIG. 3 and comprises:

In some embodiments, in 310 of FIG. 3, the receiving of the set of new FQDNs includes a set of newly observed hostnames (NOH).

Referring back to FIG. 8, in 810, the domain squatting detector splits an NOH of the set of NOHs into a plurality of first segments. In some embodiments, the first segments are separated by periods or dashes. For example, NOH microsoft.com.faewfaew.com is split into (microsoft, faewfaew, com).

In 820, the domain squatting detector splits a potential target domain into a plurality of second segments. In some embodiments, the second segments are separated by periods or dashes. As an example, the potential target domain microsoft.com is split into (microsoft, com).

In 830, the domain squatting detector compares the plurality of first segments with the plurality of second segments.

Using the above example, the NOH segments (microsoft, faewfaew, com) are compared with the potential target domain segments (microsoft, com).

First, the NOH segments are analyzed to determine whether all of the potential target domain segments are included in the NOH segments. For example, microsoft and com of the potential target domain segments are found within the NOH segments (microsoft, faewfaew, com).

Next, the matching potential target domain segments are analyzed to determine whether the included segments of the potential target domain segments are neighbors. For example, microsoft and com are neighbors (or adjacent segments) in the NOH because microsoft and com are neighbors in the NOH Microsoft.com.faewfaew.com. In other words, microsoft and com are next to each other in the NOH.

In the event that the included segments are neighbors, the order of the neighboring segments is analyzed to confirm that the order matches the order of the potential target domain microsoft.com. In another example, if the NOH is com.microsoft.faewfaew.com, the order would is different from the order of the potential target domain microsoft.com, so there is no match in this example.

Thus, if 1) all of the potential target domain segments are included in the NOH segments, 2) the included segments of the potential target domain segments are neighbors, and 3) the order of the neighboring segments matches the order of the potential target domain segments, the segments of the NOH match the segments of the potential target domain.

In 840, in response to a determination that the plurality of first segments matches the plurality of second segments, the domain squatting detector determines that the NOH is a candidate levelsquatting domain.

Figure 9:
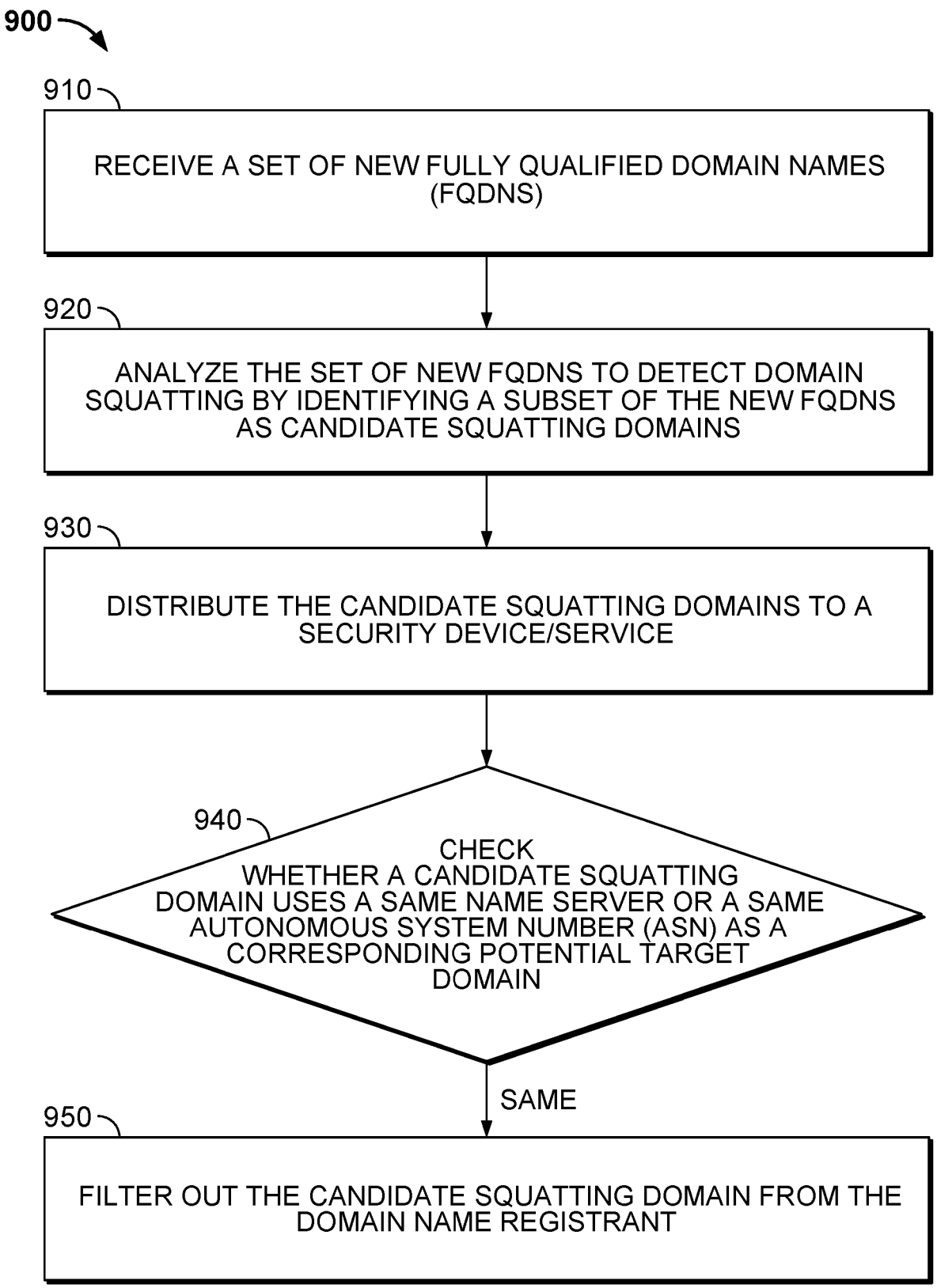
FIG. 9 is a flow diagram illustrating another process for domain squatting detection in accordance with some embodiments.

FIG. 9 is a flow diagram illustrating another process for domain squatting detection in accordance with some embodiments. In some embodiments, the process 900 is implemented by the domain squatting detector 220 of FIG. 2 and comprises:

In some embodiments, operations 910-930 corresponds with operations 310-330 of FIG. 3.

In 940, the domain squatting detector checks whether a candidate squatting domain uses a same name server or a same autonomous system number (ASN) as potential target domains.

In 950, in response to a determination that the candidate squatting domain uses the same name server or the same ASN as the corresponding potential target domain, the domain squatting detector filters out the candidate squatting domain from the domain name registrant. Typically, the owners of legitimate domains proactively acquire their squatting domains to avoid the squatting domains being controlled by bad actors.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a set of new fully qualified domain names (FQDNs);
analyze the set of new FQDNs to detect domain squatting by identifying a subset of the new FQDNs as candidate squatting domains;
check whether a candidate squatting domain of the candidate squatting domains uses a same name server or a same autonomous system number (ASN) as a corresponding potential target domain;
in response to a determination that the candidate squatting domain uses the same name server or the same ASN as the corresponding potential target domain, filter out the candidate squatting domain from the domain name registrant to obtain remaining candidate squatting domains; and
distribute the remaining candidate squatting domains to a security device/service; and
a memory coupled to the processor and configured to provide the processor with instructions.

2. The system of claim 1, wherein:
the receiving of the set of new FQDNs comprises to:
receive a set of newly registered domains (NRDs); and
the analyzing of the set of new FQDNs to detect domain squatting by identifying the subset of the new FQDNs as candidate squatting domains comprises to:
cluster the set of NRDs into lexically similar groups to obtain a plurality of NRD clusters;
calculate distances from potential target domains to the plurality of NRD clusters; and
identify a subset of NRDs having the closest distance to the potential target domains as candidate typosquatting domains.

3. The system of claim 2, wherein the subset of NRDs having the closest distance comprises:
the subset of NRDs includes N NRDs that have the closest distance, N being an integer.

4. The system of claim 2, wherein the subset of NRDs having the closest distance comprises:
NRDs that have a distance to a potential target domain less than or equal to a distance threshold.

5. The system of claim 1, wherein:
the receiving of the set of new FQDNs comprises to:
receive a set of newly registered domains (NRDs); and
the analyzing of the set of new FQDNs to detect domain squatting by identifying the subset of the new FQDNs as candidate squatting domains comprises to:
construct a trie for potential target domains;
matching the set of NRDs against the trie to determine whether the set of NRDs matches the potential target domains; and
in the event that a subset of NRDs matches the potential target domains, determine that the subset of matching NRDs are candidate combosquatting domains.

6. The system of claim 1, wherein:
the receiving of the set of new FQDNs comprises to:
receive a set of newly registered domains (NRDs); and
the analyzing of the set of new FQDNs to detect domain squatting by identifying the subset of the new FQDNs as candidate squatting domains comprises to:
convert one NRD of the set of NRDs into bits;
compare the bits of the one NRD with bits of a potential target domain using an exclusive OR (XOR) to obtain comparison results;
determine whether a single difference bit exists using the comparison results; and
in response to a determination that the single difference bit exists, determine that the one NRD is a candidate bitsquatting domain.

7. The system of claim 1, wherein:
the receiving of the set of new FQDNs comprises to:
receive a set of newly registered domains (NRDs); and
the analyzing of the set of new FQDNs to detect domain squatting by identifying the subset of the new FQDNs as candidate squatting domains comprises to:
detect an NRD of the set of NRDs corresponds to an internationalized domain name (IDN);
transform the IDN to a unicode domain name version using a converter;
identify an international character in the unicode domain name version;
substitute, using a lookup table, a corresponding homographic English character for the international character in the unicode domain name version to obtain a homographic domain name version;
compare the homographic domain name version with a set of potential target domains; and
in response to a determination that the homographic domain name version matches at least one potential target domain of the set of potential target domains, determine that the NRD is a candidate homographsquatting domain.

8. The system of claim 1, wherein:
the receiving of the set of new FQDNs comprises to:
receive a set of newly observed hostnames (NOHs); and
the analyzing of the set of new FQDNs to detect domain squatting by identifying a subset of the new FQDNs as candidate squatting domains comprises to:
split an NOH of the set of NOHs into a plurality of first segments;
split a potential target domain into a plurality of second segments;
compare the plurality of first segments with the plurality of second segments; and
in response to a determination that the plurality of first segments matches the plurality of second segments, determine that the NOH is a candidate levelsquatting domain.

9. The system of claim 8, wherein segments of the plurality of first segments and the plurality of second segments are separated by periods or dashes.

10. A method, comprising:
receiving, using a processor, a set of new fully qualified domain names (FQDNs);
analyzing, using the processor, the set of new FQDNs to detect domain squatting by identifying a subset of the new FQDNs as candidate squatting domains;

checking whether a candidate squatting domain of the candidate squatting domains uses a same name server or a same autonomous system number (ASN) as a corresponding potential target domain;

in response to a determination that the candidate squatting domain uses the same name server or the same ASN as the corresponding potential target domain, filtering out the candidate squatting domain from the domain name registrant to obtain remaining candidate squatting domains; and distributing, using the processor, the remaining candidate squatting domains to a security device/service.

11. The method of claim 10, wherein:
the receiving of the set of new FQDNs comprises:
receiving a set of newly registered domains (NRDs); and the analyzing of the set of new FQDNs to detect domain squatting by identifying the subset of the new FQDNs as candidate squatting domains comprises:
clustering the set of NRDs into lexically similar groups to obtain a plurality of NRD clusters;
calculating distances from potential target domains to the plurality of NRD clusters; and
identifying a subset of NRDs having the closest distance to the potential target domains as candidate typosquatting domains.

12. The method of claim 11, wherein the subset of NRDs having the closest distance comprises:
the subset of NRDs includes N NRDs that have the closest distance, N being an integer.

13. The method of claim 11, wherein the subset of NRDs having the closest distance comprises:
NRDs that have a distance to a potential target domain less than or equal to a distance threshold.

14. The method of claim 10, wherein:
the receiving of the set of new FQDNs comprises:
receiving a set of newly registered domains (NRDs); and the analyzing of the set of new FQDNs to detect domain squatting by identifying the subset of the new FQDNs as candidate squatting domains comprises:
constructing a trie for potential target domains;
matching the set of NRDs against the trie to determine whether the set of NRDs matches the potential target domains; and
in the event that a subset of NRDs matches the potential target domains, determining that the subset of matching NRDs are candidate combosquatting domains.

15. The method of claim 10, wherein:
the receiving of the set of new FQDNs comprises:
receiving a set of newly registered domains (NRDs); and the analyzing of the set of new FQDNs to detect domain squatting by identifying the subset of the new FQDNs as candidate squatting domains comprises:
converting one NRD of the set of NRDs into bits;
comparing the bits of the one NRD with bits of a potential target domain using an exclusive OR (XOR) to obtain comparison results;
determining whether a single difference bit exists using the comparison results; and
in response to a determination that the single difference bit exists, determining that the one NRD is a candidate bitsquatting domain.

16. The method of claim 10, wherein:
the receiving of the set of new FQDNs comprises:
receiving a set of newly registered domains (NRDs); and the analyzing of the set of new FQDNs to detect domain squatting by identifying the subset of the new FQDNs as candidate squatting domains comprises:
detecting an NRD of the set of NRDs corresponds to an internationalized domain name (IDN);
transforming the IDN to a unicode domain name version using a converter;
identifying an international character in the unicode domain name version;
substituting, using a lookup table, a corresponding homographic English character for the international character in the unicode domain name version to obtain a homographic domain name version;
comparing the homographic domain name version with a set of potential target domains; and
in response to a determination that the homographic domain name version matches at least one potential target domain of the set of potential target domains, determining that the NRD is a candidate homograph-squatting domain.

17. The method of claim 10, wherein:
the receiving of the set of new FQDNs comprises:
receiving a set of newly observed hostnames (NOHs); and the analyzing of the set of new FQDNs to detect domain squatting by identifying a subset of the new FQDNs as candidate squatting domains comprises:
splitting an NOH of the set of NOHs into a plurality of first segments;
splitting a potential target domain into a plurality of second segments;
comparing the plurality of first segments with the plurality of second segments; and
in response to a determination that the plurality of first segments matches the plurality of second segments, determining that the NOH is a candidate levelsquatting domain.

18. The method of claim 17, wherein segments of the plurality of first segments and the plurality of second segments are separated by periods or dashes.

19. A computer program product embodied in a non-transitory computer readable medium and comprising computer instructions for:
receiving a set of new fully qualified domain names (FQDNs);
analyzing the set of new FQDNs to detect domain squatting by identifying a subset of the new FQDNs as candidate squatting domains;
checking whether a candidate squatting domain of the candidate squatting domains uses a same name server or a same autonomous system number (ASN) as a corresponding potential target domain;
in response to a determination that the candidate squatting domain uses the same name server or the same ASN as the corresponding potential target domain, filtering out the candidate squatting domain from the domain name registrant to obtain remaining candidate squatting domains; and
distributing the remaining candidate squatting domains to a security device/service.

* * * * *